US008654116B2

(12) United States Patent
Tomizawa et al.

(10) Patent No.: US 8,654,116 B2
(45) Date of Patent: Feb. 18, 2014

(54) SIGNAL CONVERSION CIRCUIT AND MULTIPLE PRIMARY COLOR LIQUID CRYSTAL DISPLAY DEVICE WITH THE CIRCUIT

(75) Inventors: Kazunari Tomizawa, Osaka (JP); Tomohiko Mori, Osaka (JP); Shun Ueki, Osaka (JP); Takao Muroi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/611,600

(22) Filed: Sep. 12, 2012

(65) Prior Publication Data

US 2013/0010213 A1   Jan. 10, 2013

Related U.S. Application Data

(63) Continuation of application No. 12/312,747, filed as application No. PCT/JP2007/072463 on Nov. 20, 2007, now Pat. No. 8,294,739.

(30) Foreign Application Priority Data

Nov. 28, 2006  (JP) ................................. 2006-320545

(51) Int. Cl.
*G06F 3/038*  (2013.01)
*G09G 5/00*  (2006.01)
*H04N 9/30*  (2006.01)

(52) U.S. Cl.
USPC .......................................... 345/214; 348/791

(58) Field of Classification Search
USPC ............................................................ 345/214
See application file for complete search history.

(56) References Cited

U.S. PATENT DOCUMENTS 4,345,249 A   8/1982   Togashi
4,800,375 A   1/1989   Silverstein et al.
(Continued)

FOREIGN PATENT DOCUMENTS

EP   1 553 553   7/2005
EP   1 990 578   11/2008
(Continued)

OTHER PUBLICATIONS

C.S. McCamy et al., "A Color-Rendition Chart," Journal of Applied Photographic Engineering, vol. 2, No. 3, pp. 95-99, 1976.
(Continued)

*Primary Examiner* — Alexander S Beck
*Assistant Examiner* — Mihir Rayan
(74) *Attorney, Agent, or Firm* — Harness, Dickey & Pierce, P.L.C.

(57) ABSTRACT

A signal conversion circuit is disclosed which is suitably used in a multiprimary liquid crystal display device, and a multiprimary liquid crystal display device having such a signal conversion circuit. A signal conversion circuit according to one embodiment of the present invention is for use in a multiprimary liquid crystal display device, and converts an input video signal to a multiprimary signal corresponding to four or more primary colors. When generating a multiprimary signal for displaying dark skin, the signal conversion circuit according to an embodiment of the present invention applies a conversion to the video signal so that a color difference $\Delta u'v' = ((u'-u_{60}')^2+(v'-v_{60}')^2)$ is 0.03 or less, the color difference $\Delta u'v'$ being defined by CIE1976 chromaticity coordinates (u', v') representing a chromaticity when the pixel is viewed from the frontal direction and CIE1976 chromaticity coordinates ($u_{60}'$, $v_{60}'$) representing a chromaticity when the pixel is viewed from a 60° oblique direction.

5 Claims, 8 Drawing Sheets

(56) References Cited

U.S. PATENT DOCUMENTS

| | | |
|---|---|---|
| 6,661,488 B1 | 12/2003 | Takeda et al. |
| 6,710,825 B2 | 3/2004 | Kubo et al. |
| 6,724,452 B1 | 4/2004 | Takeda et al. |
| 6,958,791 B2 | 10/2005 | Shimoshikiryo |
| 7,034,789 B2 | 4/2006 | Takeuchi et al. |
| 7,268,757 B2 | 9/2007 | Ben-David et al. |
| 2003/0146893 A1 | 8/2003 | Sawabe |
| 2004/0174389 A1 | 9/2004 | Ben-David et al. |
| 2004/0239698 A1 | 12/2004 | Kamada et al. |
| 2005/0122294 A1 | 6/2005 | Ben-David et al. |
| 2005/0231457 A1 | 10/2005 | Yamamoto et al. |
| 2005/0264587 A1 | 12/2005 | Kurumisawa |
| 2006/0114205 A1 | 6/2006 | Shen et al. |
| 2006/0176259 A1* | 8/2006 | Yamada ................ 345/88 |
| 2006/0244686 A1* | 11/2006 | Higgins et al. ........... 345/72 |
| 2007/0035536 A1 | 2/2007 | Alessi et al. |
| 2008/0211973 A1 | 9/2008 | Hekstra et al. |
| 2009/0141381 A1 | 6/2009 | Itou et al. |
| 2009/0278982 A1 | 11/2009 | Imai et al. |
| 2011/0210911 A1 | 9/2011 | Nakamura et al. |

FOREIGN PATENT DOCUMENTS

| | | |
|---|---|---|
| EP | 1 990 678 | 11/2008 |
| JP | 09-251160 | 9/1997 |
| JP | 2001-209047 | 8/2001 |
| JP | 2001-306023 | 11/2001 |
| JP | 2004-117752 | 4/2004 |
| JP | 2004-302270 | 10/2004 |
| JP | 2005-062833 | 3/2005 |
| JP | 2005-227408 | 8/2005 |
| JP | 2005-258404 | 9/2005 |
| JP | 2006-304256 | 11/2006 |
| WO | WO 2006/109577 | 10/2006 |
| WO | WO 2006/126118 | 11/2006 |
| WO | WO 2007/132635 | 11/2007 |

OTHER PUBLICATIONS

Danny Pascale, "RGB coordinates of the Macbeth ColorChecker," The BabelColor Company, pp. 1-16, 2006.

ISR for international patent application No. PCT/JP2009/002252 mailed Aug. 11, 2009.

IPRP and WO for international patent application No. PCT/JP2009/002252 mailed Jan. 20, 2011.

European search report dated Sep. 24, 2010.

M.R. Pointer, "The Gamut of Real Surface Colours," Color Research and Application, vol. 5, No. 3, pp. 145-155, 1980.

Society for Information Display, 2005 International Symposium, Digest of Technical Papers, vol. 36, Book 2, pp. 1210-1213, May 25, 2005.

Society for Information Display, 2006 International Symposium, Digest of Technical Papers, vol. 37, Book 2, pp. 1221-1224, Jun. 7, 2006.

FPD International 2005 Forum, "Improving LCD TV Color Using Multi-primary Technology," Oct. 19, 2005.

\* cited by examiner

SIGNAL CONVERSION CIRCUIT AND MULTIPLE PRIMARY COLOR LIQUID CRYSTAL DISPLAY DEVICE WITH THE CIRCUIT

CROSS-REFERENCE TO RELATED APPLICATIONS

This application is a continuation of and claims priority under 35 U.S.C. §§120/121 to U.S. patent application Ser. No. 12/312,747, filed on May 26, 2009, which is the national phase under 35 U.S.C. §371 of PCT International Application No. PCT/JP2007/072463 which has an International filing date of Nov. 20, 2007, which designated the United States of America, and which claims priority to Japanese Patent Application 2006-320545 filed Nov. 28, 2006, the entire contents of each of which are hereby incorporated herein by reference.

TECHNICAL FIELD

The present invention relates to a liquid crystal display device, and more particularly to a multiprimary liquid crystal display device which performs display by using four or more primary colors. The present invention also relates to a signal conversion circuit for use in such a liquid crystal display device.

BACKGROUND ART

Currently, various display devices are used in a variety of applications, including liquid crystal display devices. In commonly-used display devices, each pixel is composed of three subpixels for displaying three primaries of light, i.e., red, green and blue, whereby multicolor display is achieved.

Figure 16:
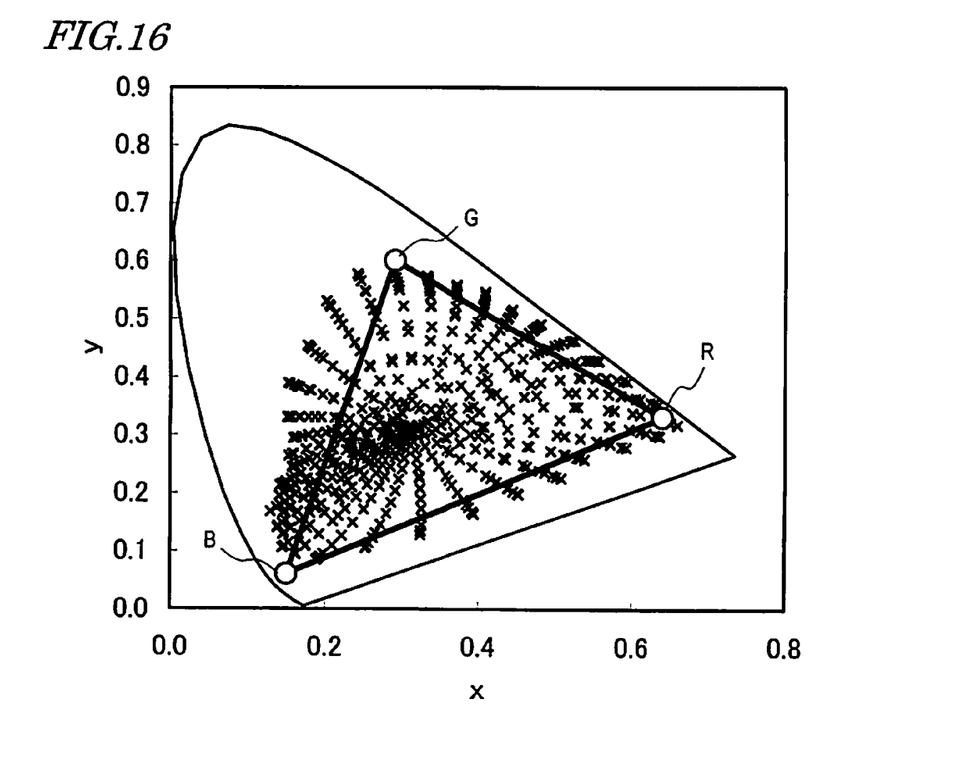
[FIG. 16] An xy chromaticity diagram showing a color gamut of a three-primary LCD.

However, conventional display devices have a problem in that they can only display colors in a narrow range (referred to as a "color gamut"). FIG. 16 shows a color gamut of a conventional display device which performs display by using three primaries. FIG. 16 is an xy chromaticity diagram in an XYZ color system, where a color gamut is shown by a triangle whose apices are at three points corresponding to the three primaries of red, green and blue. Also shown in the figure are plotted colors (represented by "x" symbols) of various objects existing in nature, as taught by Pointer (see Non-Patent Document 1). As can be seen from FIG. 16, there are some object colors which do not fall within the color gamut. Thus, display devices which perform display by using three primaries are unable to display some object colors.

Therefore, in order to broaden the color gamut of a display device, there has been proposed a technique which increases the number of primary colors to be used for displaying to four or more.

Figure 17:
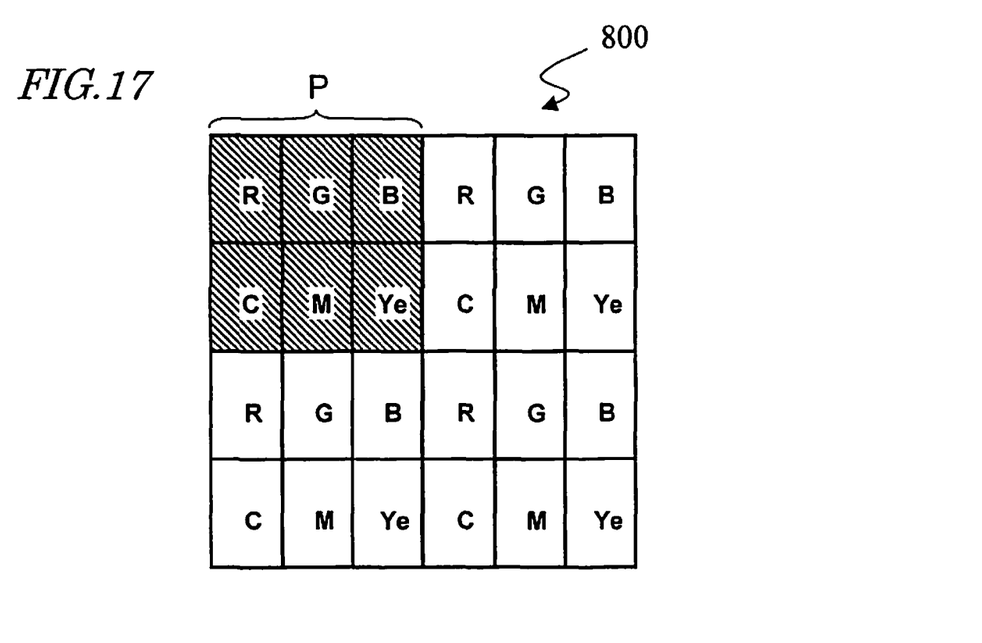
[FIG. 17] A diagram schematically showing a conventional multiprimary LCD 800.
Figure 18:
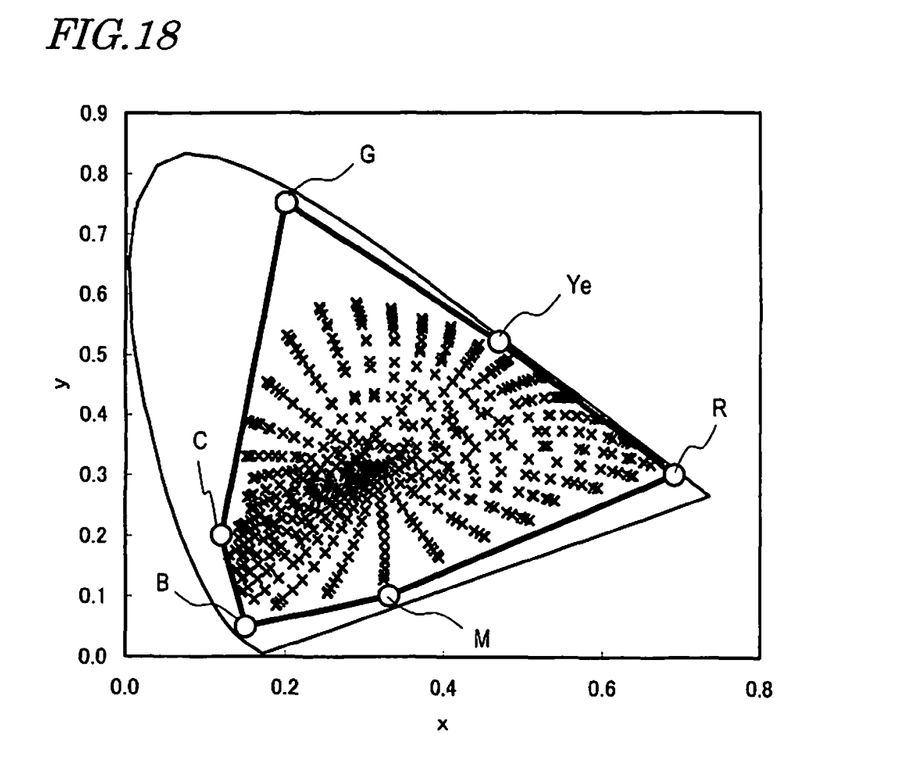
[FIG. 18] An xy chromaticity diagram showing a color gamut of the multiprimary LCD 800.

For example, as shown in FIG. 17, Patent Document 1 discloses a liquid crystal display device 800 each of whose pixels P is composed of six subpixels R, G, B, Ye, C and M for displaying red, green, blue, yellow, cyan, and magenta. The color gamut of the liquid crystal display device 800 is shown in FIG. 18. As shown in FIG. 18, a color gamut which is represented as a hexagonal shape whose apices are at six points corresponding to the six primary colors substantially encompasses all object colors. Thus, the color gamut can be broadened by increasing the number of primary colors to be used for displaying. In the present specification, display devices which perform display by using four or more primary colors will be collectively referred to as "multiprimary display devices", and liquid crystal display devices which perform display by using four or more primary colors will be referred to as "multiprimary liquid crystal display devices (or simply, multiprimary LCDs)". Moreover, conventional commonly-used display devices which perform display by using three primaries will be collectively referred to as "three-primary display devices", and liquid crystal display devices which perform display by using three primaries will be referred to as "three-primary liquid crystal display devices (or simply, three-primary LCDs)".

As the formats of a video signal to be input to a three-primary display device, the RGB format, the YCrCb format, and the like are commonly used. A video signal of these formats contains three parameters (thus being a three-dimensional signal, as it were), thus allowing the luminances of the three primaries (red, green, and blue) used for displaying to be uniquely determined.

In order to perform display with a multiprimary display device, it is necessary to convert a video signal of a format for three-primary display devices to a video signal containing more parameters (four or more parameters). Such a video signal corresponding to four or more primary colors will be referred to as a "multiprimary signal" in the present specification.

[Patent Document 1] Japanese National Phase PCT Laid-Open Publication No. 2004-529396

[Non-Patent Document 1] M. R. Pointer, "The gamut of real surface colors," Color Research and Application, Vol. 5, No. 3, pp. 145-155 (1980)

DISCLOSURE OF INVENTION

Problems to be Solved by the Invention

However, in the case where colors which are presented by a video signal of a format for three-primary display devices is to be expressed by using four or more primary colors, the luminance of each primary color will not be uniquely determined, and there will be a multitude of luminance combinations. In other words, the method of converting a three-dimensional signal to a multiprimary signal is not just one, but is highly arbitrary (highly free). Therefore, there has not been found a signal conversion technique that is optimum for a multiprimary display device. In particular, liquid crystal display devices which utilize the optical properties of liquid crystal naturally have different displaying characteristics from those of other display devices, but no signal conversion technique that takes their displaying characteristics into account have been found in the context of multiprimary liquid crystal display devices.

The present invention has been made in view of the above problems, and an objective thereof is to provide a signal conversion circuit which is suitably used in a multiprimary liquid crystal display device, and a multiprimary liquid crystal display device having such a signal conversion circuit.

Means for Solving the Problems

A signal conversion circuit according to the present invention is a signal conversion circuit for use in a multiprimary liquid crystal display device which performs display by using four or more primary colors, the signal conversion circuit converting an input video signal to a multiprimary signal corresponding to four or more primary colors, wherein when generating a multiprimary signal for a pixel of the multiprimary liquid crystal display device to display dark skin according to the Macbeth chart, the signal conversion circuit applies a conversion to the video signal so that a color difference $\Delta u'v' = ((u' - u_{60}')^2 + (v' - v_{60}')^2)$ is 0.03 or less, the color difference Δu'v' being defined by CIE1976 chromaticity coordinates (u', v') representing a chromaticity when the pixel is viewed from a frontal direction and CIE1976 chromaticity coordinates ($u_{60}'$, $v_{60}'$) representing a chromaticity when the pixel is viewed from a 60° oblique direction.

In a preferred embodiment, the signal conversion circuit according to the present invention applies a conversion to a video signal so that the color difference Δu'v' is 0.008 or less when generating a multiprimary signal for the pixel of the multiprimary liquid crystal display device to display dark skin according to the Macbeth chart.

In a preferred embodiment, the signal conversion circuit according to the present invention applies a conversion to a video signal so that the color difference Δu'v' is 0.01 or less when generating a multiprimary signal for the pixel of the multiprimary liquid crystal display device to display light skin according to the Macbeth chart.

Alternatively, the signal conversion circuit according to the present invention is a signal conversion circuit for use in a multiprimary liquid crystal display device which performs display by using four or more primary colors, the signal conversion circuit converting an input video signal to a multiprimary signal corresponding to four or more primary colors, wherein when generating a multiprimary signal for a pixel of the multiprimary liquid crystal display device to display light skin according to the Macbeth chart, the signal conversion circuit applies a conversion to the video signal so that a color difference $\Delta u'v'=((u'-u_{60}')^2+(v'-v_{60}')^2)$ is 0.01 or less, the color difference Δu'v' being defined by CIE1976 chromaticity coordinates (u', v') representing a chromaticity when the pixel is viewed from a frontal direction and CIE1976 chromaticity coordinates ($u_{60}'$, $v_{60}'$) representing a chromaticity when the pixel is viewed from a 60° oblique direction.

In a preferred embodiment, the signal conversion circuit according to the present invention applies a conversion to a video signal so that the color difference Δu'v' is 0.008 or less when generating a multiprimary signal for the pixel of the multiprimary liquid crystal display device to display light skin according to the Macbeth chart.

In a preferred embodiment, when there is a number n of primary colors to be used for displaying, the signal conversion circuit according to the present invention acquires luminances of (n−3) primary colors among the n primary colors by referring to a look-up table based on the input video signal, and calculates luminances of the remaining three primary colors among the n primary colors through a calculation using the luminances of the (n−3) primary colors.

In a preferred embodiment, the signal conversion circuit according to the present invention comprises: a look-up table memory for storing the look-up table; and a calculation section for performing the calculation.

A multiprimary liquid crystal display device according to the present invention comprises: a signal conversion circuit of the above construction; and a liquid crystal display panel to which the multiprimary signal generated by the signal conversion circuit is input.

Effects of the Invention

When converting an input video signal to a multiprimary signal corresponding to four or more primary colors, the signal conversion circuit according to the present invention applies a conversion to the video signal so that a difference between a chromaticity when a pixel is viewed from the front and a chromaticity when the pixel is viewed from an oblique direction is smaller than a predetermined value.

Specifically, when generating a multiprimary signal for displaying dark skin, the signal conversion circuit according to the present invention applies a conversion to a video signal so that a color difference $\Delta u'v'=((u'-u_{60}')^2+(v'-v_{60}')^2)$ is 0.03 or less, the color difference Δu'v' being defined by CIE1976 chromaticity coordinates (u', v') representing a chromaticity when the pixel is viewed from the frontal direction and CIE1976 chromaticity coordinates ($u_{60}'$, $v_{60}'$) representing a chromaticity when the pixel is viewed from a 60° oblique direction. Alternatively, when generating a multiprimary signal for displaying light skin, the signal conversion circuit according to the present invention applies a conversion to a video signal so that the color difference Δu'v' is 0.01 or less. As a result, deviation in hue and chroma due to whitening (viewing angle dependence of the γ characteristics) can be suppressed, whereby high-quality displaying can be realized in a multiprimary liquid crystal display device.

BRIEF DESCRIPTION OF DRAWINGS

[FIG. 3] (a) to (c) are an upper plan view, a front view, and a side view for explaining conditions for chromaticity measurement.

DESCRIPTION OF REFERENCE NUMERALS 10 liquid crystal display panel
20 signal conversion circuit
21 color coordinate conversion section
22 look-up table memory
23 calculation section
24 interpolation section
100 liquid crystal display device

BEST MODE FOR CARRYING OUT THE INVENTION

Liquid crystal display devices of the TN (Twisted Nematic) mode and the STN (Super Twisted Nematic) mode, which have conventionally been commonly used, have a disadvantage of a narrow viewing angle, and various display modes have been developed to improve this.

As display modes having improved viewing angle characteristics, the IPS (In-Plane Switching) mode disclosed in Japanese Examined Patent Publication No. 63-21907, the MVA (Multi-domain Vertical Alignment) mode disclosed in Japanese Laid-Open Patent Publication No. 11-242225, the CPA (Continuous Pinwheel Alignment) mode disclosed in Japanese Laid-Open Patent Publication No. 2003-43525, and the like are known.

In the aforementioned display modes, high-quality displaying is realized with a wide viewing angle. Recently, however, as a problem regarding viewing angle characteristics, a problem has newly emerged in that there is a difference between the $\gamma$ characteristics when observed from the front and the $\gamma$ characteristics when observed obliquely, i.e., a viewing angle dependence problem of the $\gamma$ characteristics. $\gamma$ characteristics are the gray scale dependence of display luminance. If the $\gamma$ characteristics differ between the frontal direction and the oblique direction, the state of gray scale displaying will differ depending on the direction of observation, which would be especially problematic when displaying images such as photographs and when displaying TV broadcasts or the like.

A viewing angle dependence of the $\gamma$ characteristics is visually perceived as a phenomenon where an oblique observation results in a display luminance which is increased over the original display luminance (called "whitening"). If whitening occurs, another problem occurs in that a color which is displayed by a pixel differs between when viewed from the frontal direction and when viewed from an oblique direction.

The inventors have conducted various studies concerning signal conversion techniques to be used for multiprimary LCDs, and found a signal conversion technique which can reduce deteriorations in display quality caused by a color deviation due to whitening.

Hereinafter, an embodiment of the present invention will be described with reference to the drawings. Note that the present invention is not limited to the following embodiment.

Figure 1:
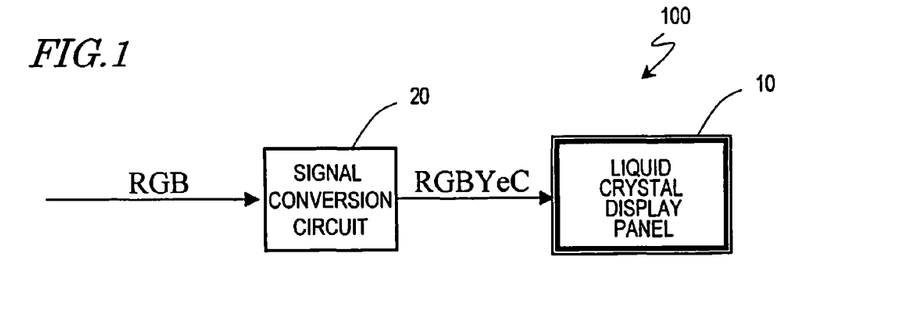
[FIG. 1] A block diagram schematically showing a liquid crystal display device 100 according to a preferred embodiment of the present invention.

FIG. 1 shows a liquid crystal display device 100 according to the present embodiment. As shown in FIG. 1, the liquid crystal display device 100 is a multiprimary LCD which includes a liquid crystal display panel 10 and a signal conversion circuit 20 and performs display by using four or more primary colors.

Figure 2:
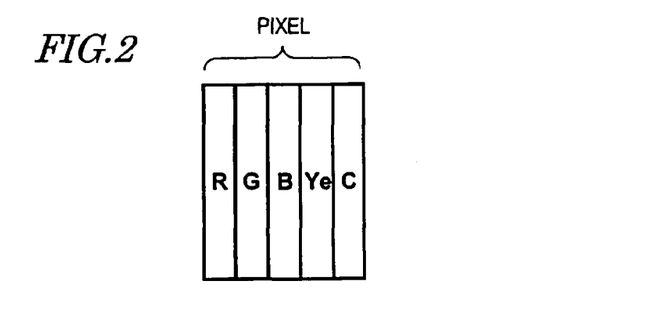
[FIG. 2] A diagram showing an exemplary pixel construction of the liquid crystal display device 100.

The liquid crystal display device 100 includes a plurality of pixels which are arranged in a matrix array, each pixel being defined by a plurality of subpixels. FIG. 2 shows an exemplary pixel construction of the liquid crystal display device 100. In the example shown in FIG. 2, the plurality of subpixels defining each pixel are a red subpixel R for displaying red, a green subpixel G for displaying green, a blue subpixel B for displaying blue, a yellow subpixel Ye for displaying yellow, and a cyan subpixel C for displaying cyan. Note that the types, number, and arrangement of subpixels constituting a pixel are not limited to those illustrated in FIG. 2. The plurality of subpixels defining each pixel only need to include four or more subpixels that display different primary colors from one another.

The signal conversion circuit 20 converts an input video signal to a multiprimary signal corresponding to four or more primary colors. As shown in FIG. 1, for example, the signal conversion circuit 20 converts a video signal (three-dimensional signal) of the RGB format, containing components indicating respective luminances of red, green, and blue into a multiprimary signal containing components indicating respective luminances red, green, blue, yellow, and cyan.

A multiprimary signal which is generated by the signal conversion circuit 20 is input to the liquid crystal display panel 10, whereby a color which is in accordance with the input multiprimary signal is displayed by each pixel. As the display mode of the liquid crystal display panel 10, various display modes (e.g., the MVA mode, the CPA mode, the IPS mode) can be used.

Although the present embodiment illustrates a case where a video signal of the RGB format is input to the signal conversion circuit 20, the video signal to be input to the signal conversion circuit 20 may be of any format so long as it is three-dimensional signal, e.g., the XYZ format or the YCrCb format.

As for the color reproducibility of a display device, memory colors are deemed important. Since in most cases it is impossible to directly compare an image that is displayed on a display device against the subject, what is important is the relationship between the displayed image and an image which is in the memory of the viewer. In a display device intended for television applications, the color of the human skin (hereinafter referred to as the "skin color") is considered especially important, among other memory colors.

When generating a multiprimary signal for displaying at least a specific skin color (the color of the human skin), the signal conversion circuit 20 in the present embodiment applies a conversion to a video signal so that the difference between the chromaticity when a pixel is viewed from the front and the chromaticity when the pixel is viewed from an oblique direction (i.e., "color difference") is smaller than a predetermined value. As a result, a color deviation due to whitening is unlikely to be visually perceived, whereby a high-quality display is realized. Hereinafter, this will be described more specifically.

Firstly, the color difference as used herein is a color difference $\Delta u'v' = ((u'-u_{60}')^2 + (v'-v_{60}')^2)$ which is defined by CIE1976 chromaticity coordinates $(u', v')$ that represent a chromaticity when the pixel is viewed from the frontal direction and CIE1976 chromaticity coordinates $(u_{60}', v_{60}')$ that represent a chromaticity when the pixel is viewed from a 60° oblique direction.

The signal conversion circuit 20 in the present embodiment applies a conversion to a video signal so that the color difference Δu'v' is 0.03 or less when generating a multiprimary signal for displaying Dark Skin according to the Macbeth chart (which is a color checker which is commonly used for checking color reproducibility). Moreover (alternatively), the signal conversion circuit 20 applies a conversion to a video signal so that the color difference Δu'v' is 0.01 or less when generating a multiprimary signal for Light Skin.

Since chromaticity is a colorimetric property which depends on hue and chroma, a small color difference Δu'v' means a small deviation in hue and chroma. In a conventional commonly-used three-primary LCD, the color difference Δu'v' when displaying dark skin exceeds 0.03, and the color difference Δu'v' when displaying light skin exceeds 0.01. Therefore, by ensuring that the color difference Δu'v' falls within the aforementioned ranges, the deviation in hue and chroma due to whitening can be reduced as compared to a conventional three-primary LCD.

Note that the ranges of "dark skin" and "light skin" in the present specification are each defined by a Y value and a chromaticity x,y as shown in Table 1. The Y values shown in Table 1 indicate relative values against the Y value of a pixel when displaying white, which is defined as 100.

TABLE 1

| | (Y, x, y) |
|---|---|
| dark skin | (10.1 ± 0.5, 0.400 ± 0.02, 0.350 ± 0.02) |
| light skin | (35.8 ± 1, 0.377 ± 0.02, 0.345 ± 0.02) |

Figure 3:
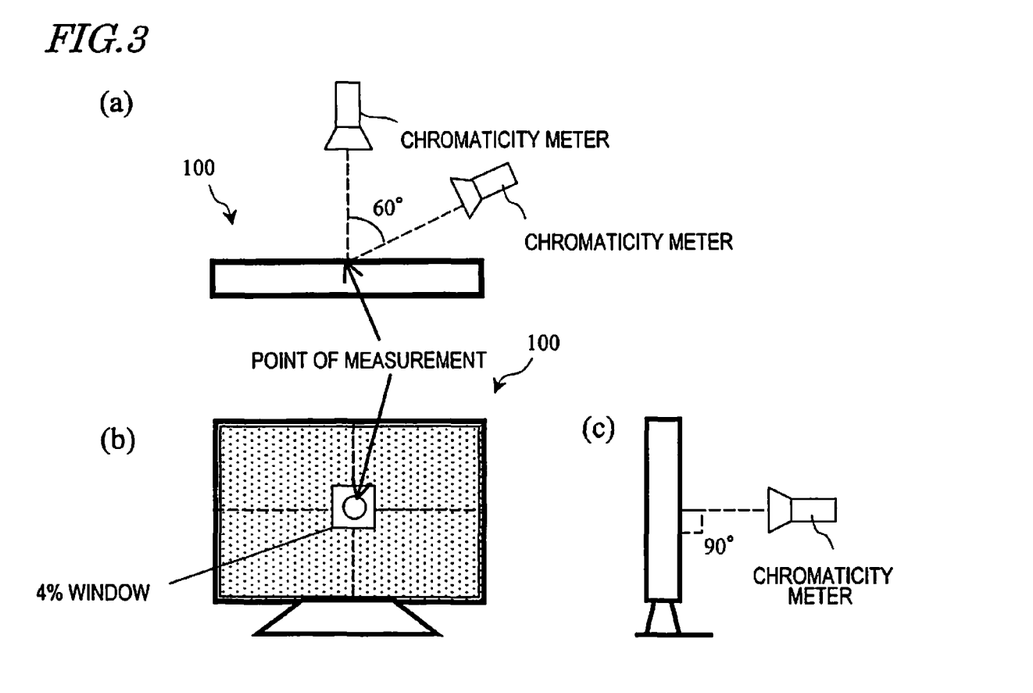

Moreover, a chromaticity when the pixel is viewed from the frontal direction and a chromaticity when the pixel is viewed from a 60° oblique direction can be measured as shown in FIGS. 3(a) to (c), for example. FIGS. 3(a) to (c) are an upper plan view, a front view, and a side view for explaining conditions for chromaticity measurement.

As shown in FIGS. 3(a) and (c), chromaticity meters may be placed in a frontal direction and a 60° oblique direction (e.g. a direction which is tilted by 60° in a horizontal direction as shown in the figure) with respect to the display surface of the liquid crystal display device 100, and measurements may be taken while inputting a signal such that the pixel will have a chromaticity corresponding to a dark skin or light skin chromaticity when measured by the chromaticity meter which is in the frontal direction.

Preferably, a region in the display surface which is actually subjected to chromaticity measurement (a point of measurement) has an area of about 50 to 100 pixels, in order to avoid influences of the black mask and the like in each pixel. Moreover, the Y values (luminance) for dark skin and light skin may be determined as relative values against the Y value for white, which is displayed in a window (shown in FIG. 3(b)) corresponding to 4% of the display surface, being defined as 100.

In order to further reduce deviation in hue and chroma, it is more preferable that the signal conversion circuit 20 applies a conversion to a video signal so that the color difference Δu'v' is 0.008 or less when generating a multiprimary signal for displaying dark skin or light skin. By ensuring that the color difference Δu'v' falls within such ranges, deviation in hue and chroma due to whitening can be greatly reduced, whereby a very high display quality is obtained.

Note that, among hue, chroma, and lightness (luminance) as the three attributes of color, deviation in lightness (luminance) is relatively unlikely to be recognized, whereas deviation in hue and chroma is relatively easily recognized. According to natural principles, it is difficult to reduce deviation in all of the above three attributes when the pixel is viewed from the frontal direction and when viewed from an oblique direction. However, the signal conversion circuit 20 of the present embodiment greatly reduces deterioration in display quality by decreasing deviation in hue and chroma with a higher priority.

Hereinafter, the aforementioned effects will be described in more detail, based on specific examples.

First, with reference to FIG. 4 and FIG. 5, the reason why color deviation occurs due to whitening in a three-primary LCD will be described.

Figure 4:
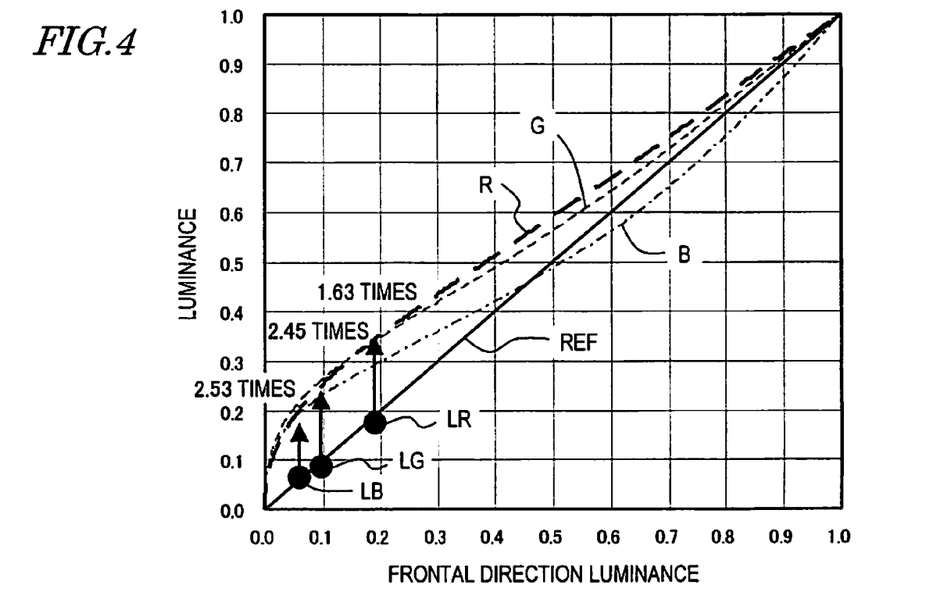
[FIG. 4] A graph showing a relationship between luminance characteristics in the frontal direction and luminance characteristics in a 60° oblique direction, with respect to each of a red subpixel, green subpixel, and a blue subpixel of a three-primary LCD.
Figure 5:
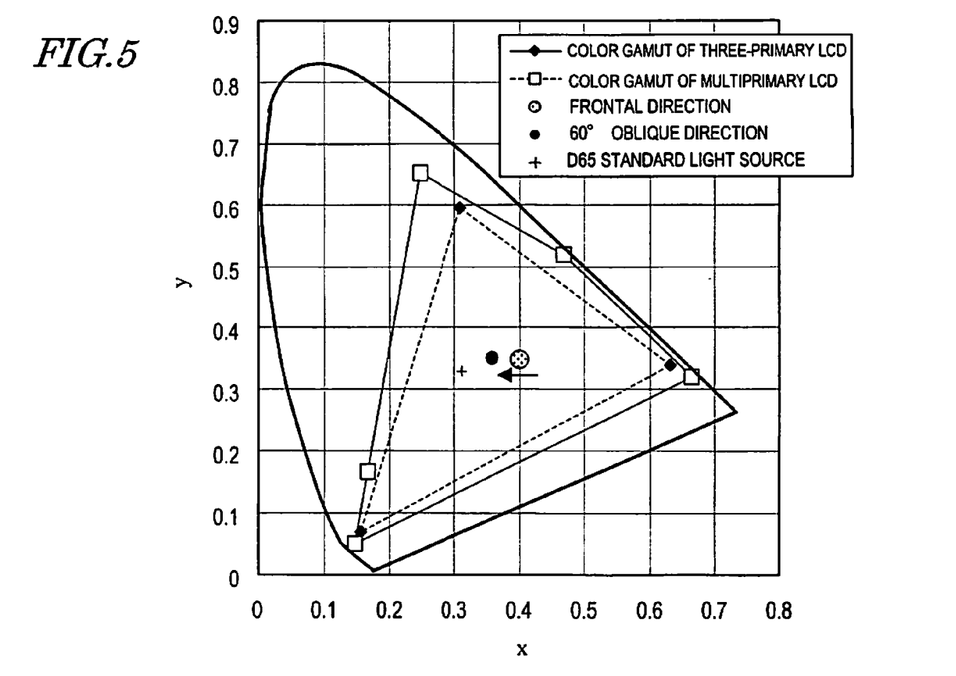
[FIG. 5] An xy chromaticity diagram showing a deviation of chromaticity when a pixel of a three-primary LCD is viewed from a 60° oblique direction.

FIG. 4 is for clearly expressing a difference between luminance characteristics in the frontal direction and luminance characteristics in a 60° oblique direction, with respect to each of a red subpixel, a green subpixel, and a blue subpixel of a three-primary LCD, where the deviation of luminance characteristics is visualized by taking the frontal direction luminance as a value on the horizontal axis and taking the frontal direction luminance or the 60° oblique direction luminance (corresponding respectively to the frontal direction or the 60° oblique direction) as a value on the vertical axis. Note that the luminance of each direction is indicated with normalization, assuming that the luminance when a white voltage (highest gray scale voltage) is applied is 1.

In FIG. 4, the luminance characteristics in the frontal direction (REF) are a straight line because the value on the horizontal axis=the value on the vertical axis. On the other hand, the luminance characteristics (R, G, B) in a 60° oblique direction are curves. The deviation amount of these curves from the straight line representing the luminance characteristics in the frontal direction quantitatively indicates a deviation amount (difference) in luminance between when observed in the front and when observed obliquely.

In a three-primary LCD, there is one combination of luminances of subpixels for a pixel to display a certain color. For example, in the case where dark skin (Y, x, y)=(10.1, 0.400, 0.350) is to be displayed in a three-primary LCD of certain specifications, the luminances of the red subpixel, the green subpixel, and the blue subpixel are (LR, LG, LB)=(0.182, 0.081, 0.062), as also shown in FIG. 4.

However, when viewed from a 60° oblique direction, these luminances are increased, specifically, they are (LR, LG, LB)=(0.296, 0.199, 0.157). In other words, the luminances of the red subpixel, the green subpixel, and the blue subpixel are increased by 1.63 times, 2.45 times, and 2.53 times, respectively. Thus, since the luminances of the respective primary colors are increased by different ratios, the chromaticity is deviated, as can be seen from the xy chromaticity diagram shown in FIG. 5. Specifically, since the red subpixel luminance has a lower ratio of increase than those of the green subpixel luminance and the blue subpixel luminance, the chromaticity is shifted toward the cyan side.

Next, with reference to FIG. 6 and FIG. 7, the reason why color deviation also occurs due to whitening in a multiprimary LCD will be described.

Figure 6:
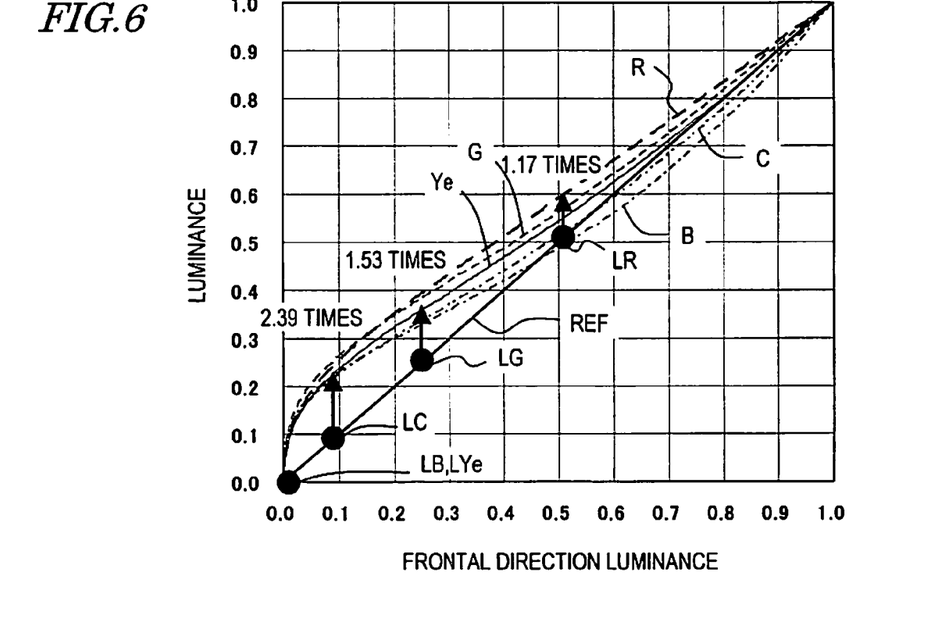
[FIG. 6] A graph showing a relationship between luminance characteristics in the frontal direction and luminance characteristics in a 60° oblique direction, with respect to each of a red subpixel, a green subpixel, a blue subpixel, a yellow subpixel, and a cyan subpixel of a multiprimary LCD.

FIG. 6 is a graph showing a difference between the luminance characteristics in the frontal direction and the luminance characteristics in a 60° oblique direction with respect to each of a red subpixel, a green subpixel, a blue subpixel, a yellow subpixel, and a cyan subpixel of a multiprimary LCD. It can be seen from FIG. 6 that, also in a multiprimary LCD, the luminance characteristics (REF) in the frontal direction and the luminance characteristics (R, G, B, Ye, C) in a 60° oblique direction are different.

In a multiprimary LCD, a plurality of combinations of subpixel luminances exist for a pixel to display a certain color. In a multiprimary LCD having subpixels which display primary colors according to chromaticities x,y, and Y values as shown in Table 2, when displaying dark skin (Y, x, y)=(10.1, 0.400, 0.350), the luminances of a red subpixel, a green subpixel, a blue subpixel, a yellow subpixel, and a cyan subpixel are (LR, LG, LB, LYe, LC)=(0.505, 0.247, 0.000, 0.000, 0.089) as also shown in FIG. 6, for example.

TABLE 2

|  | x | y | Y |
|---|---|---|---|
| red subpixel | 0.663 | 0.319 | 0.079 |
| green subpixel | 0.248 | 0.651 | 0.184 |
| blue subpixel | 0.150 | 0.079 | 0.056 |
| yellow subpixel | 0.468 | 0.518 | 0.504 |
| cyan subpixel | 0.168 | 0.167 | 0.178 |

However, when viewed from a 60° oblique direction, these luminances are increased, specifically, they are (LR, LG, LB, LYe, LC)=(0.593, 0.379, 0.000, 0.000, 0.213). In other words, the luminances of the red subpixel, the green subpixel, and the cyan subpixel are increased by 1.17 times, 1.53 times, and 2.39 times, respectively.

Figure 7:
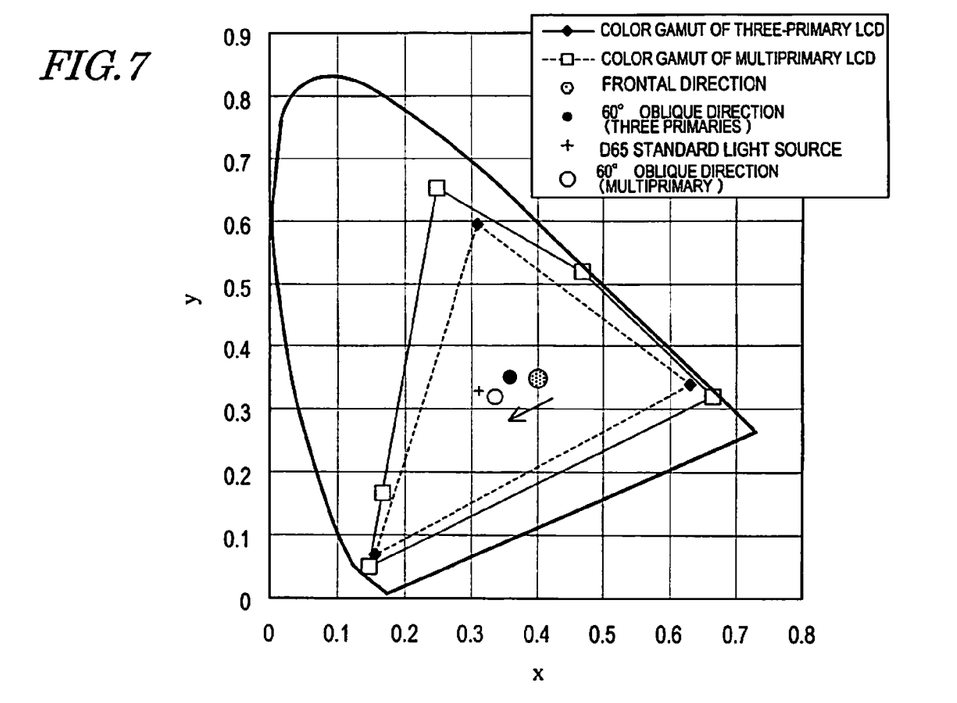
[FIG. 7] An xy chromaticity diagram showing a deviation of chromaticity when a pixel of a multiprimary LCD is viewed from a 60° oblique direction.

Thus, since the luminances of the respective primary colors are increased by different ratios, the chromaticity is deviated, as can be seen from the xy chromaticity diagram shown in FIG. 7. Specifically, since the red subpixel luminance has a lower ratio of increase than those of the green subpixel luminance and the blue subpixel luminance, the chromaticity is shifted toward the cyan side. For comparison, FIG. 7 also shows a chromaticity when a three-primary LCD is viewed from a 60° oblique direction. It can be seen from FIG. 7 that the chromaticity is more deviated in this example than in the case of a three-primary LCD.

Next, with reference to FIG. 8 and FIG. 9, the reason why a color deviation due to whitening is reduced by selecting an appropriate one from among a plurality of combinations of luminance that exist will be described.

Figure 8:
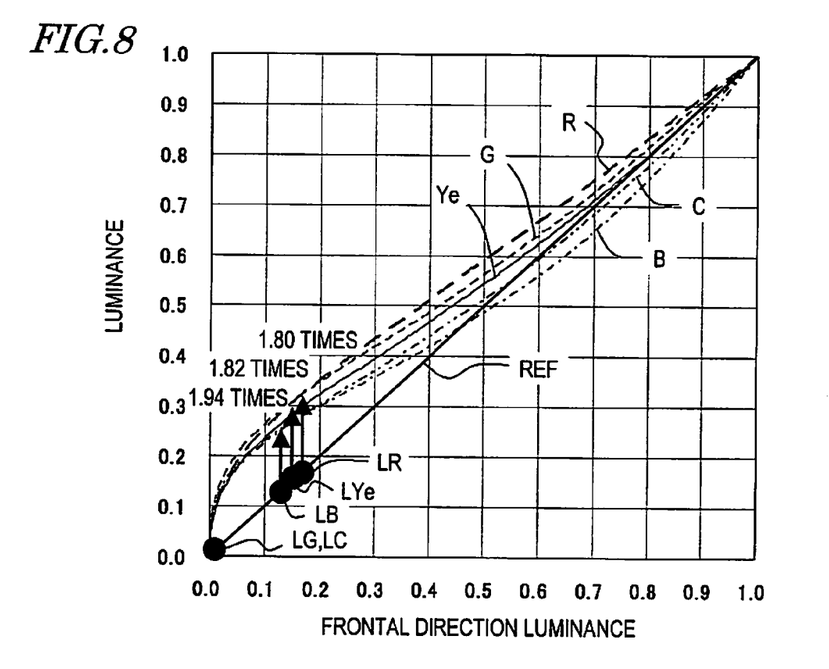
[FIG. 8] A graph showing a relationship between luminance characteristics in the frontal direction and luminance characteristics in a 60° oblique direction, with respect to each of a red subpixel, a green subpixel, a blue subpixel, a yellow subpixel, and a cyan subpixel of a multiprimary LCD.
Figure 9:
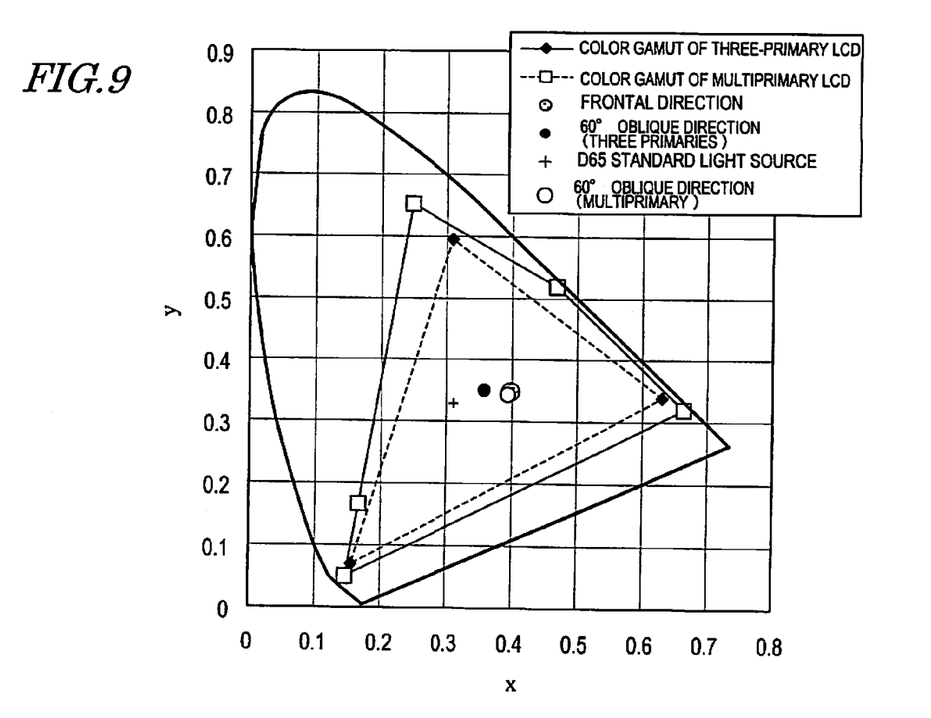
[FIG. 9] An xy chromaticity diagram showing a deviation of chromaticity when a pixel of a multiprimary LCD is viewed from a 60° oblique direction.

In a multiprimary LCD having subpixels with chromaticities x,y, and Y values as shown in Table 2, a case will be considered where (LR, LG, LB, LYe, LC)=(0.187, 0.000, 0.128, 0.157, 0.000) are selected as the subpixel luminances for displaying dark skin (Y, x, y)=(10.1, 0.400, 0.350), as also shown in FIG. 8.

When viewed from a 60° oblique direction, these luminances are increased, specifically, they are (LR, LG, LB, LYe, LC)=(0.337, 0.000, 0.249, 0.287, 0.000). However, since the luminances of the red subpixel, the blue subpixel, and the yellow subpixel are increased by substantially the same ratio, i.e., 1.80 times, 1.94 times, and 1.82 times, respectively, the chromaticity is hardly shifted, as can be seen from the xy chromaticity diagram shown in FIG. 9.

Although the case of displaying dark skin has been described, the same is also true of the case of displaying light skin. Hereinafter, this will be described with reference to FIG. 10 and FIG. 11.

Figure 10:
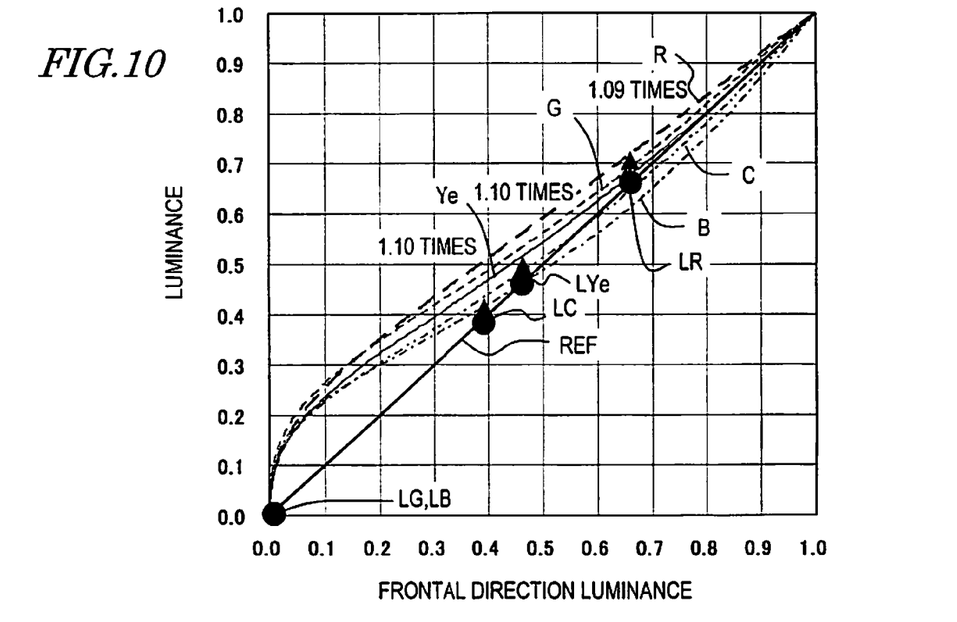
[FIG. 10] A graph showing a relationship between luminance characteristics in the frontal direction and luminance characteristics in a 60° oblique direction, with respect to each of a red subpixel, a green subpixel, a blue subpixel, a yellow subpixel, and a cyan subpixel of a multiprimary LCD.
Figure 11:
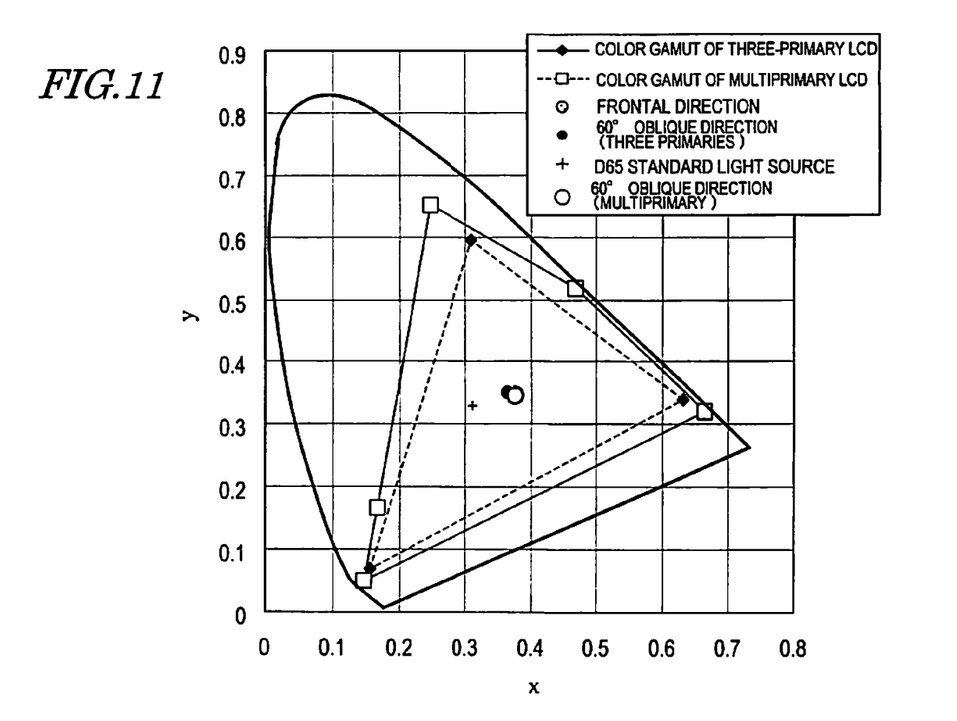
[FIG. 11] An xy chromaticity diagram showing a deviation of chromaticity when a pixel of a multiprimary LCD is viewed from a 60° oblique direction.

In a multiprimary LCD having subpixels with chromaticities x,y, and Y values as shown in Table 2, a case will be considered where (LR, LG, LB, LYe, LC)=(0.646, 0.000, 0.000, 0.470, 0.394) are selected as the subpixel luminances for displaying light skin (Y, x, y)=(35.8, 0.377, 0.345), as also shown in FIG. 10.

When viewed from a 60° oblique direction, these luminances are increased, specifically, they are (LR, LG, LB, LYe, LC)=(0.703, 0.000, 0.000, 0.519, 0.432). However, since the luminances of the red subpixel, the yellow subpixel, and the cyan subpixel are increased by substantially the same ratio, i.e., 1.09 times, 1.10 times, and 1.10 times, respectively, the chromaticity is hardly shifted, as can be seen from the xy chromaticity diagram shown in FIG. 11.

As described above, in the liquid crystal display device 100 according to the present embodiment, among combinations of subpixel luminances for a pixel to display a certain color, a combination that reduces the chromaticity deviation is selected. Table 3 shows a combination of luminances of a red subpixel, a green subpixel, a blue subpixel, a yellow subpixel, and a cyan subpixel for displaying dark skin (Y, x, y)=(10.1, 0.400, 0.350) in a multiprimary LCD having subpixels with chromaticities x,y, and Y values as shown in Table 2. In addition to the luminances of the respective subpixels (LR, LG, LB, LYe, LC), Table 3 also shows luminances when viewed from a 60° oblique direction (i.e., luminances under whitening), and a Y value and a chromaticity x,y representing the color of the pixel when viewed from a 60° oblique direction, as well as a color difference Δu'v'. Moreover, Table 4 shows combinations of luminances of subpixels, etc., for displaying the same dark skin in a three-primary LCD.

TABLE 3 subpixel luminance combinations that can display dark skin (Y, x, y) = (10.1, 0.400, 0.350)

| (LR, LG, LB, LYe, LC) | 60° oblique direction whitening | 60° oblique direction (Y, x, y) | color difference Δu'v' |
|---|---|---|---|
| #1 (0.187, 0.000, 0.128, 0.157, 0.000) | (0.337, 0.000 0.249, 0.287, 0.000) | (18.5, 0.394, 0.343) | 0.004 |
| #2 (0.247, 0.000, 0.000, 0.128, 0.099) | (0.388, 0.000, 0.000, 0.261, 0.222) | (20.1, 0.379, 0.344) | 0.014 |
| #3 (0.505, 0.298, 0.111, 0.000, 0.000) | (0.593, 0.414, 0.237, 0.000, 0.000) | (13.6, 0.350, 0.315) | 0.033 |
| #4 (0.505, 0.247, 0.000, 0.000, 0.089) | (0.593, 0.379, 0.000, 0.000, 0.213) | (15.4, 0.337, 0.321) | 0.041 |
| #5 (0.426, 0.180, 0.006, 0.037, 0.087) | (0.529, 0.329, 0.80, 0.154, 0.211) | (22.2, 0.345, 0.339) | 0.036 |
| . . . | . . . | . . . | . . . |

TABLE 4 subpixel luminance combinations that can display dark skin (Y, x, y) = (10.1, 0.400, 0.350)

| (LR, LG, LB) | 60° oblique direction whitening | 60° oblique direction (Y, x, y) | color difference Δu'v' |
|---|---|---|---|
| (0.182, 0.081, 0.062) | (0.296, 0.199, 0.157) | (21.7, 0.359, 0.352) | 0.029 |

As shown in Table 3, in a multiprimary LCD, a plurality of luminance combinations exist for displaying dark skin (even besides #1 to #5 exemplified herein, as will be appreciated). On the other hand, in a three-primary LCD, there is one luminance combination for displaying dark skin, as shown in Table 4. The signal conversion circuit 20 generates a multiprimary signal so that a combination ensuring that the color difference Δu'v' is 0.03 or less (e.g., #1 or #2) is selected from among the plurality of combinations. Note that, as has already been described, a combination ensuring that the color difference Δu'v' is 0.008 or less is more preferably selected (e.g., #1).

Moreover, Table 5 similarly shows combinations of subpixel luminances, etc., for displaying light skin (Y, x, y)= (35.8, 0.377, 0.345) in a multiprimary LCD, and Table 6 shows combinations of subpixel luminances, etc., for displaying the same light skin in a three-primary LCD.

TABLE 5 subpixel luminance combinations that can display light skin (Y, x, y) = (35.8, 0.377, 0.345)

| (LR, LG, LB, LYe, LC) | 60° oblique direction whitening | 60° oblique direction (Y, x, y) | color difference Δu'v' |
|---|---|---|---|
| #1 (0.652, 0.104, 0.231, 0.470, 0.212) | (0.709, 0.264, 0.315, 0.519, 0.308) | (43.8, 0.352, 0.336) | 0.016 |
| #2 (1.000, 0.379, 0.049, 0.289, 0.344) | (1.000, 0.469, 0.178, 0.384, 0.397) | (43.9, 0.354, 0.337) | 0.013 |
| #3 (0.500, 0.000, 0.334, 0.548, 0.133) | (0.588, 0.000, 0.377, 0.579, 0.251) | (40.4, 0.358, 0.325) | 0.014 |
| #4 (0.426, 0.001, 0.505, 0.586, 0.003) | (0.529, 0.035, 0.488, 0.610, 0.053) | (39.2, 0.377, 0.345) | 0.000 |
| #5 (0.646, 0.000, 0.000, 0.470, 0.394) | (0.703, 0.000, 0.000, 0.519, 0.432) | (39.4, 0.377, 0.346) | 0.000 |
| . . | . | . | . |
| . . | . | . | . |
| . . | . | . | . |

TABLE 6 subpixel luminance combinations that can display light skin (Y, x, y) = (35.8, 0.377, 0.345)

| (LR, LG, LB) | 60° oblique direction whitening | 60° oblique direction (Y, x, y) | color difference Δu'v' |
|---|---|---|---|
| (0.574, 0.305, 0.254) | (0.621, 0.390, 0.303) | (43.2, 0.366, 0.352) | 0.011 |

As shown in Table 5, in a multiprimary LCD, a plurality of luminance combinations exist for displaying light skin (even besides #1 to #5 exemplified herein). On the other hand, in a three-primary LCD, there is one luminance combination for displaying light skin, as shown in Table 6. The signal conversion circuit 20 generates a multiprimary signal so that a combination ensuring that the color difference Δu'v' is 0.01 or less (e.g., #4 or #5) is selected from among the plurality of combinations. Note that, as has already been described, a combination ensuring that the color difference Δu'v' is 0.008 or less is more preferably selected (for example, #4 and #5 satisfy this condition).

Next, the reason why the chromaticity is not shifted if the luminances of the subpixels are increased by the same ratio when viewed from an oblique direction will be described by using mathematical equations.

First, when a value obtained by multiplying the luminance and chromaticity of each subpixel is expressed by eqs. (1) to (5) below, the color (X, Y, Z) which is displayed by the pixel will be a sum thereof, as expressed by eqs. (6) to (8) below.

(red subpixel luminance)×(red subpixel chromaticity)=$LR(XR,YR,ZR)$ (1)

(green subpixel luminance)×(green subpixel chromaticity)=$LG(XG,YG,ZG)$ (2)

(blue subpixel luminance)×(blue subpixel chromaticity)=$LB(XB,YB,ZB)$ (3)

(yellow subpixel luminance)×(yellow subpixel chromaticity)=$LYe(XYe,YYe,ZYe)$ (4)

(cyan subpixel luminance)×(cyan subpixel chromaticity)=$LC(XC,YC,ZC)$ (5)

$X=LR \times XR+LG \times XG+LB \times XB+LYe \times XYe+LC \times XC$ (6)

$Y=LR \times YR+LG \times YG+LB \times YB+LYe \times YYe+LC \times YC$ (7)

$Z=LR \times ZR+LG \times ZG+LB \times ZB+LYe \times ZYe+LC \times ZC$ (8)

This color (X, Y, Z) which is represented by tristimulus values is converted to a chromaticity x,y by eqs. (9) and (10) below.

$$x=X/(X+Y+Z)$$ (9)

$$y=Y/(X+Y+Z)$$ (10)

On the other hand, if the luminance of each subpixel is uniformly multiplied A times when viewed from an oblique direction, the color when viewed from the oblique direction will be a sum (AX, AY, AZ) of A×LR(XR, YR, ZR), A×LG (XG, YG, ZG), A×LB(XB, YB, ZB), A×LYe(XYe, YYe, ZYe), and A×LC(XC, YC, ZC), which are respectively the products of A times multiplication of the right-hand sides of eqs. (1) to (5). This color (AX, AY, AZ) is converted to chromaticity x,y by eqs. (11) and (12) below.

$$x=AX/(AX+AY+AZ)$$ (11)

$$y=AY/(AX+AY+AZ)$$ (12)

The right-hand sides of eqs. (11) and (12) are eventually reduced to eqs. (11)' and (12)' below because the A that are included in the denominator and the numerator are canceled out.

$$x=AX/(AX+AY+AZ)=X/(X+Y+Z)$$ (11)'

$$y=AY/(AX+AY+AZ)=Y/(X+Y+Z)$$ (12)'

As can be seen from a comparison of eqs. (9) and (10) against eqs. (11)' and (12)', the chromaticity x,y when viewed from the frontal direction and the chromaticity x,y when viewed from an oblique direction are the same, i.e., the chromaticity is not shifted (however, the luminance is multiplied A times). Although a chromaticity x,y in the XYZ (CIE1931) color system is described herein, the same is also true of a chromaticity u', v' in the L*u*v* (CIE1976) color system.

Although what has been described above is a case where the luminance of each subpixel is increased by the same ratio when a pixel is viewed from an oblique direction (uniformly multiplied A times), this being for simplicity of description, it is not necessary for the luminance of each subpixel to be increased by the same ratio in order to suppress shifting in chromaticity.

For example, in the case where the luminances of the red subpixel, the green subpixel, the blue subpixel, the yellow subpixel, and the cyan subpixel are respectively multiplied B times, C times, D times, E times, F times when viewed from an oblique direction, it suffices if the color when viewed from the oblique direction, i.e., a sum of B×LR(XR, YR, ZR), C×LG(XG, YG, ZG), D×LB(XB, YB, ZB), E×LYe(XYe, YYe, ZYe), and F×LC(XC, YC, ZC), which respectively are products of B times multiplication, C times multiplication, D times multiplication, E times multiplication, and F times multiplication of the right-hand sides of eqs. (1) to (5), is expressed in the form of (AX, AY, AZ).

Stated otherwise, it is not necessary that the values obtained by multiplying the luminance and chromaticity of each subpixel are uniformly multiplied A times before the summation, but it suffices if the sum of them is in an A times-multiplied form in the end. Hereinafter, this point will be described by using a more specific example.

When (LR, LG, LB, LYe, LC)=(0.426, 0.001, 0.505, 0.586, 0.003) are selected as the subpixel luminances for displaying light skin (Y, x, y)=(35.8, 0.377, 0.345), the values obtained by multiplying the luminance and chromaticity of each subpixel are calculated from eqs. (13) to (17) below.

$$LR(XR,YR,ZR)=0.426(0.164,0.079,0.004) \quad (13)$$

$$LG(XG,YG,ZG)=0.001(0.070,0.187,0.029) \quad (14)$$

$$LB(XB,YB,ZB)=0.505(0.107,0.056,0.548) \quad (15)$$

$$LYe(XYe,YYe,ZYe)=0.586(0.455,0.504,0.014) \quad (16)$$

$$LC(XC,YC,ZC)=0.003(0.179,0.178,0.707) \quad (17)$$

Figure 12:
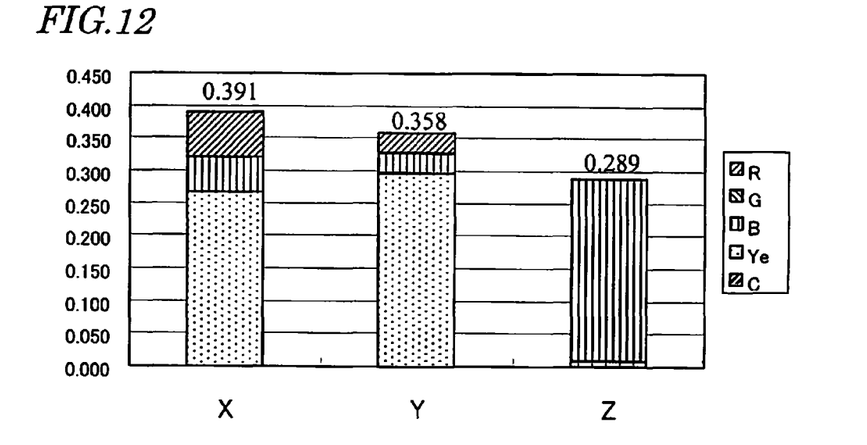
[FIG. 12] A graph showing XYZ values of a displayed color when a pixel is viewed from the frontal direction.

Therefore, the color (X, Y, Z) to be displayed by the pixel is (0.391, 0.358, 0.289), as can be seen from eqs. (18) to (20) below and FIG. 12.

$$X=0.426\times0.164+0.001\times0.070+0.505\times0.107+0.586\times0.455+0.003\times0.179=0.391 \quad (18)$$

$$Y=0.426\times0.079+0.001\times0.187+0.505\times0.056+0.586\times0.504+0.003\times0.178=0.358 \quad (19)$$

$$Z=0.426\times0.004+0.001\times0.029+0.505\times0.548+0.586\times0.014+0.003\times0.707=0.289 \quad (20)$$

On the other hand, the luminances of the subpixels when viewed from a 60° oblique direction are (LR, LG, LB, LYe, LC)=(0.529, 0.035, 0.488, 0.610, 0.053). Therefore, the values obtained by multiplying the luminance and chromaticity of each subpixel when viewed from the 60° oblique direction are products of 1.24 times multiplication, 35.0 times multiplication, 0.97 times multiplication, 1.04 times multiplication, and 17.7 times multiplication of the right-hand sides of eqs. (13) to (17), respectively, as can be seen from eqs. (21) to (25) below.

$$0.529(0.164,0.079,0.004)=1.24\times0.426(0.164,0.079,0.004) \quad (21)$$

$$0.035(0.070,0.187,0.029)=35.0\times0.001(0.070,0.187,0.029) \quad (22)$$

$$0.488(0.107,0.056,0.548)=0.97\times0.505(0.107,0.056,0.548) \quad (23)$$

$$0.610(0.455,0.504,0.014)=1.04\times0.586(0.455,0.504,0.014) \quad (24)$$

$$0.053(0.179,0.178,0.707)=17.7\times0.003(0.179,0.178,0.707) \quad (25)$$

Figure 13:
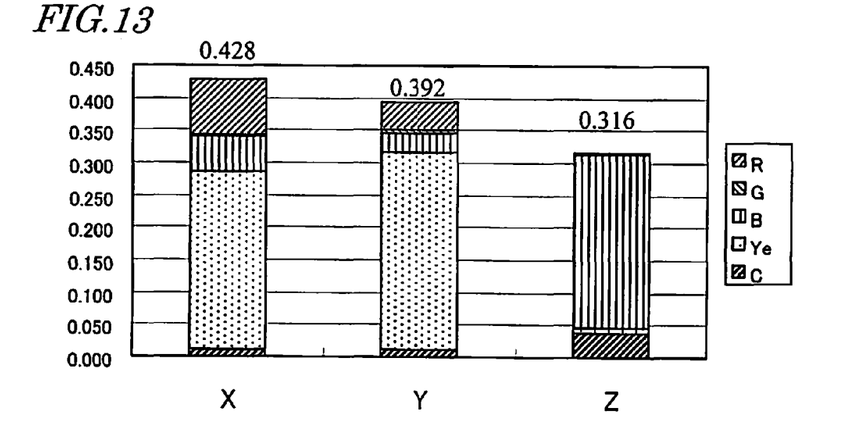
[FIG. 13] A graph showing XYZ values of a displayed color when a pixel is viewed from a 60° oblique direction.

Moreover, the color (X, Y, Z) when viewed from the 60° oblique direction is (0.428, 0.392, 0.316), as can be seen from eqs. (26) to (28) below and FIG. 13.

$$X=0.529\times0.164+0.035\times0.070+0.488\times0.107+0.610\times0.455+0.053\times0.179=0.428 \quad (26)$$

$$Y=0.529\times0.079+0.035\times0.187+0.488\times0.056+0.610\times0.504+0.053\times0.178=0.392 \quad (27)$$

$$Z=0.529\times0.004+0.035\times0.029+0.488\times0.548+0.610\times0.014+0.053\times0.707=0.316 \quad (28)$$

As can also be seen from eq. (29) below, the respective components of this color (X, Y, Z)=(0.428, 0.392, 0.316) when viewed from the 60° oblique direction are products of universal 1.094 times multiplication of the respective components of the color (X, Y, Z)=(0.391, 0.358, 0.289) when viewed from the frontal direction. Thus, in the end, the chromaticity when viewed from the frontal direction and the chromaticity when viewed from an oblique direction are the same, and the chromaticity is not shifted.

$$(X, Y, Z) = (0.428, 0.392, 0.316) \quad (29)$$
$$= 1.094(0.391, 0.358, 0.289)$$

As described above, so long as the signal conversion circuit 20 generates a multiprimary signal such that a combination which reduces chromaticity deviation is selected from among combinations of subpixel luminances, the signal conversion circuit 20 does not need to select a combination which ensures that the luminances of the respective subpixels are increased by substantially the same ratio when viewed from an oblique direction.

Next, an example of a more specific construction of the signal conversion circuit 20 will be described.

For example, the signal conversion circuit 20 may include a look-up table which contains data indicating subpixel luminances corresponding to colors to be identified by a video signal (three-dimensional signal), thus being able to generate a multiprimary signal by referring to this look-up table in accordance with the input video signal. However, if data representing subpixel luminances concerning all colors is included in the look-up table, the look-up table will have a large data amount, thus making it difficult to simply construct a look-up table by using an inexpensive memory with a small capacity.

Figure 14:
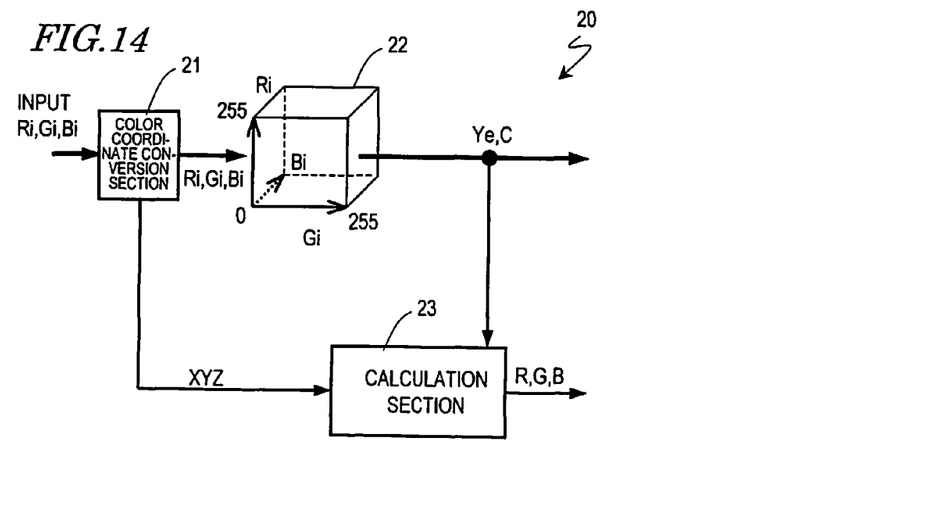
[FIG. 14] A block diagram showing an example of a preferable construction for a signal conversion circuit 20 included in the liquid crystal display device 100.

FIG. 14 shows an example of a preferable construction of the signal conversion circuit 20. The signal conversion circuit 20 shown in FIG. 14 includes a color coordinate conversion section 21, a look-up table memory 22, and a calculation section 23.

The color coordinate conversion section 21 receives a video signal representing the luminance of three primaries, and converts color coordinates in the RGB color space to color coordinates in the XYZ color space. Specifically, as shown in eq. (30) below, the color coordinate conversion section 21 performs a matrix conversion to an RGB signal (which contains components Ri, Gi, Bi corresponding to the respective luminances of red, green, blue) to obtain XYZ values. The matrix of 3 rows by 3 columns which is exemplified in eq. (30) is defined based on the BT.709 standard.

[math. 1]

$$\begin{pmatrix} X \\ Y \\ Z \end{pmatrix} = \begin{pmatrix} 0.4124 & 0.3576 & 0.1804 \\ 0.2127 & 0.7152 & 0.0722 \\ 0.0193 & 0.1192 & 0.9502 \end{pmatrix} \begin{pmatrix} Ri \\ Gi \\ Bi \end{pmatrix} \quad (30)$$

A look-up table is stored in the look-up table memory 22. This look-up table includes data representing the luminances of a yellow subpixel and a cyan subpixel corresponding to the luminances Ri, Gi, Bi of the three primaries indicated by the video signal. Note that, herein, the luminances Ri, Gi, Bi are obtained by applying an inverse γ correction to gray scale values which are expressed in 256 gray scale levels, and the number of colors that are identifiable by the video signal is 256×256×256. On the other hand, the look-up table in the look-up table memory 22 includes data of a 256×256×256 three-dimensional matrix structure corresponding to the number of colors that are identifiable by the video signal. By referring to the look-up table in the look-up table memory 22, luminances Ye, C of the yellow subpixel and the cyan subpixel corresponding to the luminances Ri, Gi, Bi can be obtained.

The calculation section 23 performs a calculation using the XYZ values obtained by the color coordinate conversion section 21 and the luminances Ye, C of the yellow subpixel and the cyan subpixel obtained from the look-up table memory 22, thus calculating luminances R, G, B of the red subpixel, the green subpixel, and the blue subpixel. Specifically, the calculation section 23 performs the calculation according to eq. (31) below.

[math. 2]

$$\begin{pmatrix} R \\ G \\ B \end{pmatrix} = \begin{pmatrix} X_R & X_G & X_B \\ Y_R & Y_G & Y_B \\ Z_R & Z_G & Z_B \end{pmatrix}^{-1} \begin{pmatrix} X - (X_{Ye} \times Ye + X_C \times C) \\ Y - (Y_{Ye} \times Ye + Y_C \times C) \\ Z - (Z_{Ye} \times Ye + Z_C \times C) \end{pmatrix} \quad (31)$$

Hereinafter, the reason why the luminances R, G, B of the red subpixel, the green subpixel, and the blue subpixel are calculated by performing the calculation shown in eq. (31) will be described with reference to eqs. (32) and (33) below.

[math. 3]

$$\begin{pmatrix} X \\ Y \\ Z \end{pmatrix} = \begin{pmatrix} X_R & X_G & X_B & X_{Ye} & X_C \\ Y_R & Y_G & Y_B & Y_{Ye} & Y_C \\ Z_R & Z_G & Z_B & Z_{Ye} & Z_C \end{pmatrix} \begin{pmatrix} R \\ G \\ B \\ Ye \\ C \end{pmatrix} \quad (32)$$

[math. 4]

$$\begin{pmatrix} X \\ Y \\ Z \end{pmatrix} = \begin{pmatrix} X_R & X_G & X_B \\ Y_R & Y_G & Y_B \\ Z_R & Z_G & Z_B \end{pmatrix} \begin{pmatrix} R \\ G \\ B \end{pmatrix} + \begin{pmatrix} X_{Ye} & X_C \\ Y_{Ye} & Y_C \\ Z_{Ye} & Z_C \end{pmatrix} \begin{pmatrix} Ye \\ C \end{pmatrix} \quad (33)$$

Assuming that the color that is identified by a video signal which is input to the signal conversion circuit 20 is identical to the color that is identified by a multiprimary signal which is output from the signal conversion circuit 20, the XYZ values which are obtained by converting the luminances Ri, Bi, Gi of the three primaries are also expressed by the matrix conversion equation for the luminances R, G, B, Ye, C of the red subpixel, the green subpixel, the blue subpixel, the yellow subpixel, and the cyan subpixel, as shown by eq. (32). Coefficients $X_R, Y_R, Z_R \ldots Z_C$ of the conversion matrix of 3 rows by 5 columns shown in eq. (32) are determined based on the XYZ values of the respective subpixels of the liquid crystal display panel 10.

The right-hand side of eq. (32) can be transformed into a sum of a product of multiplying R, G, B by a conversion matrix of 3 rows by 3 columns and a product of multiplying Ye, C by a conversion matrix of 3 rows by 2 columns, as shown in eq. (33). By further transforming eq. (33), eq. (31) is obtained. Therefore, by performing a calculation in accordance with eq. (31), the luminances R, G, B of the red subpixel, the green subpixel, and the blue subpixel can be calculated.

Thus, the calculation section 23 is able to obtain luminances R, G, B of the red subpixel, the green subpixel, and the blue subpixel based on the XYZ values obtained by the color coordinate conversion section 21 and the luminances Ye, C of the yellow subpixel and the cyan subpixel obtained from the look-up table memory 22.

As described above, in the signal conversion circuit 20 shown in FIG. 14, the luminance of two subpixels are first determined by using a look-up table which is stored in the look-up table memory 22, and thereafter the luminances of the other three subpixels are determined by the calculation section 23. Therefore, the look-up table to be stored in the look-up table memory 22 does not need to contain data indicating the luminances of all five subpixels, but may only contain data indicating the luminances of two subpixels among the five subpixels. Thus, by adopting the construction as shown in FIG. 14, it is possible to simply construct a look-up table by using an inexpensive memory with a small capacity.

Figure 15:
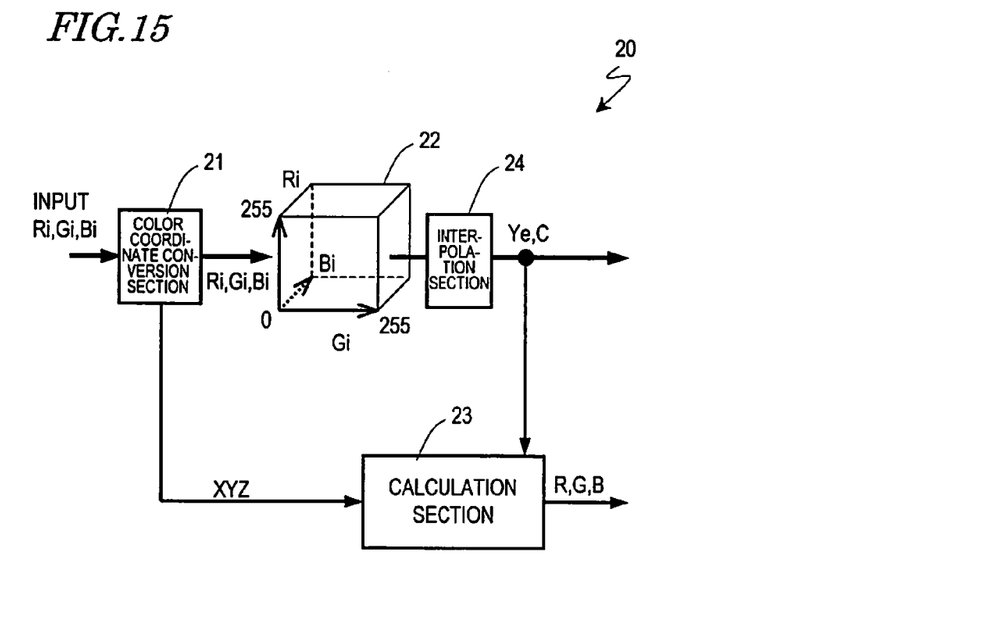
[FIG. 15] A block diagram showing another example of a preferable construction for the signal conversion circuit 20 included in the liquid crystal display device 100.

FIG. 15 shows another example of a preferable construction for the signal conversion circuit 20. The signal conversion circuit 20 shown in FIG. 15 differs from the signal conversion circuit 20 shown in FIG. 14 in that it further includes an interpolation section 24 in addition to the color coordinate conversion section 21, the look-up table memory 22, and the calculation section 23.

Moreover, in the signal conversion circuit 20 shown in FIG. 14, the data of the look-up table stored in the look-up table memory 22 corresponds to the same number of colors as the number of colors identified by the video signal, whereas in the conversion circuit 20 shown in FIG. 15, the data in the look-up table corresponds to a smaller number of color than the number of colors identified by the video signal.

Herein, the luminances Ri, Gi, Bi of the three primaries indicated by the video signal each have 256 gray scale levels, and the number of colors identified by the video signal is 256×256×256. On the other hand, the look-up table in the look-up table memory 22 includes data of a 17×17×17 three-dimensional matrix structure corresponding to gray scale levels that are 16 levels apart, e.g., 0, 16, 32, . . . , 256 gray scale levels, for each of the luminances Ri, Gi, Bi. That is, the look-up table includes 17×17×17 data as obtained by thinning out the 256×256×256.

By using the data (luminances of the yellow subpixel and the cyan subpixel) contained in the look-up table, the interpolation section 24 interpolates between the luminances Ye, C of the yellow subpixel and the cyan subpixel that correspond to the gray scale levels which have been lost through thinning out. The interpolation section 24 performs interpolation via linear approximation, for example. In this manner, the luminances Ye, C of the yellow subpixel and the cyan subpixel corresponding to the luminances Ri, Gi, Bi of the three primaries can be obtained for all gray scale levels.

By using the XYZ values obtained by the color coordinate conversion section 21 and the luminances Ye, C of the yellow subpixel and the cyan subpixel obtained by the look-up table memory 22 and the interpolation section 24, the calculation section 23 calculates the luminances R, G, B of the red, green, and blue subpixels.

As described above, in the signal conversion circuit 20 shown in FIG. 15, there are fewer colors corresponding to the data in the look-up table stored in the look-up table memory 22 than the number of colors identified by the video signal. Therefore, the data amount in the look-up table can be further reduced.

The above description illustrates an example where data indicating the luminances of the yellow subpixel and the cyan subpixel is contained in a look-up table and the calculation section 23 calculates the luminances of the remaining red subpixel, green subpixel, and blue subpixel. However, the present invention is not limited thereto. By including data indicating the luminances of any two arbitrary subpixels in the look-up table, it becomes possible to calculate the luminances of the other three subpixels with the calculation section 23.

Moreover, also in the case where the number of subpixels defining each pixel is not five as illustrated, a similar technique can be used to reduce the data amount in the look-up table. Given that the number of primary colors used for displaying is n, by referring to a look-up table, the signal conversion circuit 20 may acquire the luminances of (n−3) primary colors among the n primary colors (i.e., luminance data concerning (n−3) primary colors is included in the look-up table), and the luminances of the remaining three primary colors among the n primary colors may be calculated through a calculation using the luminances of the (n−3) primary colors.

For example, in the case where one pixel is defined by four subpixels, the signal conversion circuit 20 may acquire the luminance of one subpixel by referring to a look-up table, and the luminances of the remaining three subpixels may be calculated through a calculation by the calculation section 23. The four subpixels may be, for example, a red subpixel, a green subpixel, a blue subpixel, and a yellow subpixel.

Moreover, in the case where one pixel is defined by six subpixels, the luminances of three subpixels may be acquired by referring to a look-up table, and the luminances of the remaining three subpixels may be calculated by the calculation section 23. The six subpixels may be, for example, a red subpixel, a green subpixel, a blue subpixel, a yellow subpixel, a cyan subpixel, and a magenta subpixel.

The constituent elements in the signal conversion circuit 20 can be implemented in hardware, or some of all of them may be implemented in software. In the case where these constituent elements are implemented in software, they may be constructed by using a computer, this computer having a CPU (central processing unit) for executing various programs, a RAM (random access memory) functioning as a work area for executing such programs, and the like. Then, programs for realizing the functions of the respective constituent elements are executed in the computer, thus allowing the computer to operate as the respective constituent elements.

Moreover, the programs may be supplied from a storage medium to the computer, or supplied to the computer via a communications network. The storage medium may be constructed so as to be removable from the computer, or may be incorporated into the computer. This storage medium may be mounted to the computer so that the computer can directly read the program code recorded thereon, or mounted so that the program code is read via a program reading device which is connected to the computer as an external storage device. The followings can be used as the storage medium, for example: a tape such as a magnetic tape or a cassette tape; a disk including a magnetic disk such as a flexible disk/hard disk, a magneto-optical disk such as an MO or an MD, and an optical disk such as a CD-ROM, a DVD, or a CD-R; a card such as an IC card (including memory cards) or an optical card; or a semiconductor memory such as a mask ROM, an EPROM (Erasable Programmable Read Only Memory), an EEPROM (Electrically Erasable Programmable Read Only Memory), or a flash ROM. Moreover, in the case where a program is supplied via a communications network, the program may be in the form of a carrier wave or a data signal such that its program code is embodied through an electronic transmission.

Industrial Applicability

According to the present invention, a signal conversion circuit to be suitably used in a multiprimary liquid crystal display device is provided. In a multiprimary liquid crystal display device having the signal conversion circuit according to the present invention, a color deviation due to whitening when being observed from an oblique direction is suppressed, thus making it possible to perform display with a high quality. Thus, a multiprimary liquid crystal display device having the signal conversion circuit according to the present invention is suitably used in various electronic devices such as liquid crystal television sets.

The invention claimed is:

1. A signal conversion circuit for use in a multiprimary liquid crystal display device which performs display by using four or more primary colors, the signal conversion circuit converting an input video signal to a multiprimary signal corresponding to four or more primary colors, wherein
the signal conversion circuit applies a conversion to the video signal by selecting a combination, from among a plurality of combinations of subpixel luminances for a pixel to display a certain color, which ensures that ratios between the respective components of tristimulus values (X, Y, Z) representing a color when the pixel performing display according to the multiprimary signal is viewed from a 60° oblique direction and the respective components of tristimulus values (X, Y, Z) representing a color when the pixel performing display according to the multiprimary signal is viewed from a frontal direction are substantially equal.

2. The signal conversion circuit of claim 1, wherein the signal conversion circuit applies a conversion to the video signal by selecting a combination which ensures that a luminance of each subpixel when a pixel is viewed from a 60° oblique direction is increased by the same ratio from that of each subpixel when a pixel is viewed from a frontal direction.

3. The signal conversion circuit of claim 1, wherein, when there is a number n of primary colors to be used for displaying, the signal conversion circuit acquires luminances of (n−3) primary colors among the n primary colors by referring to a look-up table based on the input video signal, and calculates luminances of the remaining three primary colors among the n primary colors through a calculation using the luminances of the (n−3) primary colors.

4. The signal conversion circuit of claim 3, comprising:
a look-up table memory for storing the look-up table; and
a calculation section for performing the calculation.

5. A multiprimary liquid crystal display device comprising:
the signal conversion circuit of claim 1; and
a liquid crystal display panel to which the multiprimary signal generated by the signal conversion circuit is input.

* * * * *